United States Patent
Kim et al.

(10) Patent No.: US 11,561,083 B2
(45) Date of Patent: Jan. 24, 2023

(54) SECONDARY BATTERY AND APPARATUS AND METHOD FOR MEASURING DIMENSION OF SECONDARY BATTERY

(71) Applicant: LG CHEM, LTD., Seoul (KR)

(72) Inventors: Tae Hyun Kim, Daejeon (KR); Kieun Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 68 days.

(21) Appl. No.: 16/647,235

(22) PCT Filed: Nov. 5, 2018

(86) PCT No.: PCT/KR2018/013323
§ 371 (c)(1),
(2) Date: Mar. 13, 2020

(87) PCT Pub. No.: WO2019/088785
PCT Pub. Date: May 9, 2019

(65) Prior Publication Data
US 2020/0271437 A1    Aug. 27, 2020

(30) Foreign Application Priority Data

Nov. 6, 2017   (KR) .................. 10-2017-0146571
Nov. 2, 2018   (KR) .................. 10-2018-0133294

(51) Int. Cl.
*G01B 11/02*   (2006.01)
*H01M 10/04*   (2006.01)
(Continued)

(52) U.S. Cl.
CPC ............. *G01B 11/02* (2013.01); *H01M 10/04* (2013.01); *H01M 10/4285* (2013.01); *H01M 50/105* (2021.01)

(58) Field of Classification Search
CPC ...... G01B 11/02; G01B 11/022; G01B 11/024; G01B 11/028; G01B 11/03; G01B 11/04;
(Continued)

(56) References Cited

U.S. PATENT DOCUMENTS 6,515,492 B1   2/2003  Wood
8,741,505 B2   6/2014  Byun et al.
(Continued)

FOREIGN PATENT DOCUMENTS

CN   1794512 A    6/2006
DE   102016218868 A1 *  3/2018  ............ H01M 10/04
(Continued)

OTHER PUBLICATIONS

International Search Report (with partial translation) and Written Opinion dated Feb. 9, 2019, issued in corresponding International Patent Application No. PCT/KR2018/013323.
(Continued)

*Primary Examiner* — Gordon J Stock, Jr.
(74) *Attorney, Agent, or Firm* — Morgan, Lewis & Bockius LLP

(57) ABSTRACT

The present invention relates to a secondary battery and an apparatus and method for measuring a dimension of the secondary battery. The secondary battery according to the present invention comprises: an electrode assembly in which an electrode and a separator are alternately laminated to be combined with each other; a pouch accommodating the electrode assembly therein; and a fluorescent reference marker applied to a portion of an outer surface of the pouch and comprising a fluorescent material, wherein the fluorescent reference marker emits fluorescence when an electromagnetic wave is irradiated so that the fluorescent reference marker serves as a reference point for measuring a dimension of the secondary battery.

20 Claims, 14 Drawing Sheets

(51) Int. Cl.
*H01M 10/42* (2006.01)
*H01M 50/105* (2021.01)

(58) Field of Classification Search
CPC ..... G01B 11/043; G01B 11/046; G01B 11/06; G01B 11/16; G01B 11/24; G01B 11/28; G01B 11/285; G01B 11/30; G01B 11/303; G01B 11/306; H01M 10/04; H01M 10/4285; H01M 50/10; H01M 50/102; H01M 50/103; H01M 50/105
See application file for complete search history.

(56) References Cited

U.S. PATENT DOCUMENTS

| | | | | |
|---|---|---|---|---|
| 9,553,465 | B2* | 1/2017 | Raghavan | G01R 31/382 |
| 10,151,802 | B2* | 12/2018 | Riemer | G01R 31/3842 |
| 10,587,003 | B2* | 3/2020 | Kim | H01M 50/1243 |
| 10,845,181 | B2* | 11/2020 | Kim | G01R 31/392 |
| 10,924,664 | B2* | 2/2021 | Yoder | H04N 5/332 |
| 2004/0239291 | A1* | 12/2004 | Watanabe | H01M 50/209 |
| | | | | 320/106 |
| 2006/0134511 | A1 | 6/2006 | Ito et al. | |
| 2007/0069153 | A1 | 3/2007 | Pai-Paranjape et al. | |
| 2008/0044059 | A1 | 2/2008 | Kotler et al. | |
| 2008/0062429 | A1 | 3/2008 | Liang et al. | |
| 2014/0057198 | A1 | 2/2014 | Byun et al. | |
| 2014/0272543 | A1* | 9/2014 | Devan | H01M 10/0436 |
| | | | | 429/162 |

FOREIGN PATENT DOCUMENTS

| | | | | |
|---|---|---|---|---|
| JP | H11-288031 | A | | 10/1999 |
| JP | 2002-156211 | A | | 5/2002 |
| JP | 2003-123710 | A | | 4/2003 |
| JP | 2004-247141 | A | | 9/2004 |
| JP | 2004247141 | A | * | 9/2004 |
| JP | 2012119290 | A | * | 6/2012 ....... B29C 45/14065 |
| JP | 2013-016513 | A | | 1/2013 |
| JP | 2014-069488 | A | | 4/2014 |
| JP | 2017-004884 | A | | 1/2017 |
| JP | 2017004884 | A | * | 1/2017 |
| KR | 20-0400748 | Y1 | | 11/2005 |
| KR | 10-2006-0023472 | A | | 3/2006 |
| KR | 20070006090 | A | * | 1/2007 |
| KR | 10-0709835 | B1 | | 4/2007 |
| KR | 10-2012-0008297 | A | | 1/2012 |
| KR | 10-2014-0005614 | A | | 1/2014 |
| KR | 10-1347975 | B1 | | 1/2014 |
| KR | 10-2014-0015647 | A | | 2/2014 |
| KR | 10-2014-0024704 | A | | 3/2014 |
| KR | 20060023472 | A | * | 3/2014 |
| KR | 10-2015-0005085 | A | | 1/2015 |
| KR | 10-2015-0029364 | A | | 3/2015 |
| KR | 10-2017-0024498 | A | | 3/2017 |
| WO | WO-2019130662 | A1 | * | 7/2019 ............. B32B 33/00 |

OTHER PUBLICATIONS

Extended European Search Report issued from the European Patent Office dated Oct. 22, 2020 in corresponding European patent application No. 18874851.1.

* cited by examiner

SECONDARY BATTERY AND APPARATUS AND METHOD FOR MEASURING DIMENSION OF SECONDARY BATTERY

CROSS-REFERENCE TO RELATED APPLICATION

The present application claims the benefit of the priority of Korean Patent Application Nos. 10-2017-0146571, filed on Nov. 6, 2017, and 10-2018-0133294, filed on Nov. 2, 2018, which are hereby incorporated by reference in their entirety.

TECHNICAL FIELD

The present invention relates to a secondary battery and an apparatus for measuring a dimension of the secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

Also, the electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack type or stack/folding type electrode assembly is built in a pouch-type battery case provided as an aluminum lamination sheet is attracting much attention due to its low manufacturing cost, light weight, easy shape deformation, and the like, and thus, its usage is gradually increasing.

In case of the pouch type battery, there is no reference point for measuring a dimension. Thus, there is a problem that a measurement error occurs for each measurement.

DISCLOSURE OF THE INVENTION

Technical Problem

One aspect of the prevent invention is to provide a secondary battery in which a dimension thereof is easily measured to prevent a measurement error from occurring or significantly reduce the occurrence of the measurement error, and an apparatus and method for measuring the dimension of the secondary battery.

Another aspect of the present invention is to provide a secondary battery in which a tolerance thereof is easily analyzed and an apparatus and method for measuring a dimension of the secondary battery.

Technical Solution

A secondary battery according to an embodiment of the present invention comprises: an electrode assembly in which an electrode and a separator are alternately laminated to be combined with each other; a pouch accommodating the electrode assembly therein; and a fluorescent reference marker applied to a portion of an outer surface of the pouch and comprising a fluorescent material, wherein the fluorescent reference marker emits fluorescence when an electromagnetic wave is irradiated so that the fluorescent reference marker serves as a reference point for measuring a dimension of the secondary battery.

An apparatus for measuring a dimension of a secondary battery, which comprises an electrode assembly and a pouch accommodating the electrode assembly, according to an embodiment of the present invention comprises: an ultraviolet irradiation unit irradiating ultraviolet rays to fluoresce the fluorescent reference marker, which is applied to a portion of an outer surface of the pouch and comprises a fluorescent material; and a laser measurement unit irradiating/receiving laser light to/from the pouch to measure the dimension of the secondary battery on the basis of the fluorescent reference marker that fluoresces to be detected.

A method for measuring a dimension of a secondary battery, which comprises an electrode assembly and a pouch comprising a main body accommodating the electrode assembly, according to an embodiment of the present invention comprises: a fluorescent marking step of applying a fluorescent reference marker, which comprises a fluorescent material, on a portion of an outer surface of the pouch; an ultraviolet irradiation step of irradiating the ultraviolet rays to the pouch to allow the fluorescent reference marker applied to a portion of the outer surface of the pouch to fluoresce; and a dimension measurement step of irradiating/receiving laser light to/from the pouch to measure the dimension of the secondary battery on the basis of the fluorescent reference marker that fluoresces to be detected.

Advantageous Effects

According to the present invention, the fluorescent reference marker may be applied to the outer surface of the pouch of the secondary battery. Thus, when the dimension is measured, the dimension may be easily measured by using the reference point to prevent the measurement error from occurring or significantly reduce the occurrence of the measurement error.

In addition, the variation in full width and length of the secondary battery for each process may be easily measured, and thus, the tolerance may be easily analyzed.

MODE FOR CARRYING OUT THE INVENTION

Figure 1:
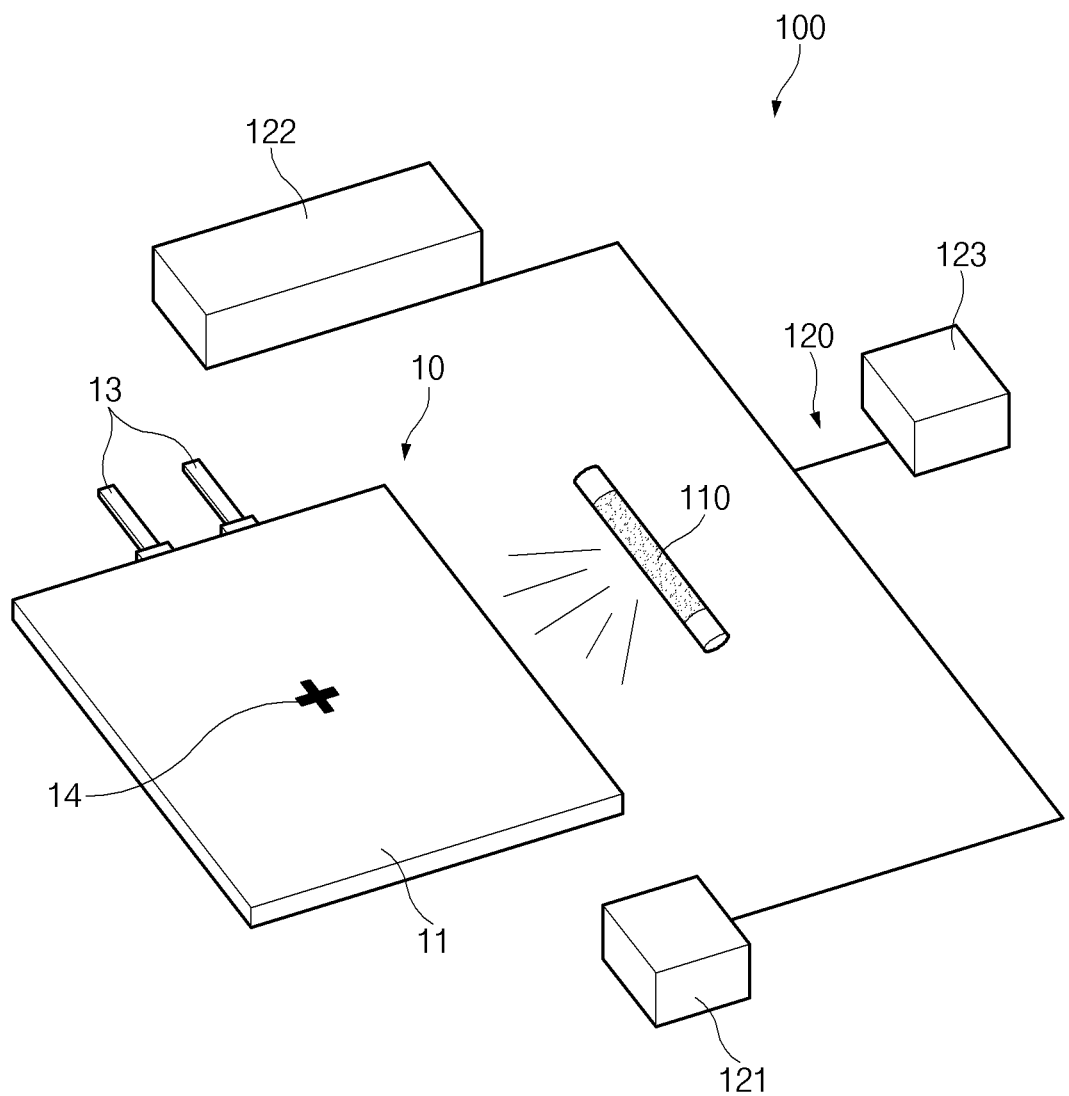
FIG. 1 is a conceptual perspective view of a secondary battery and an apparatus for measuring a dimension of the secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
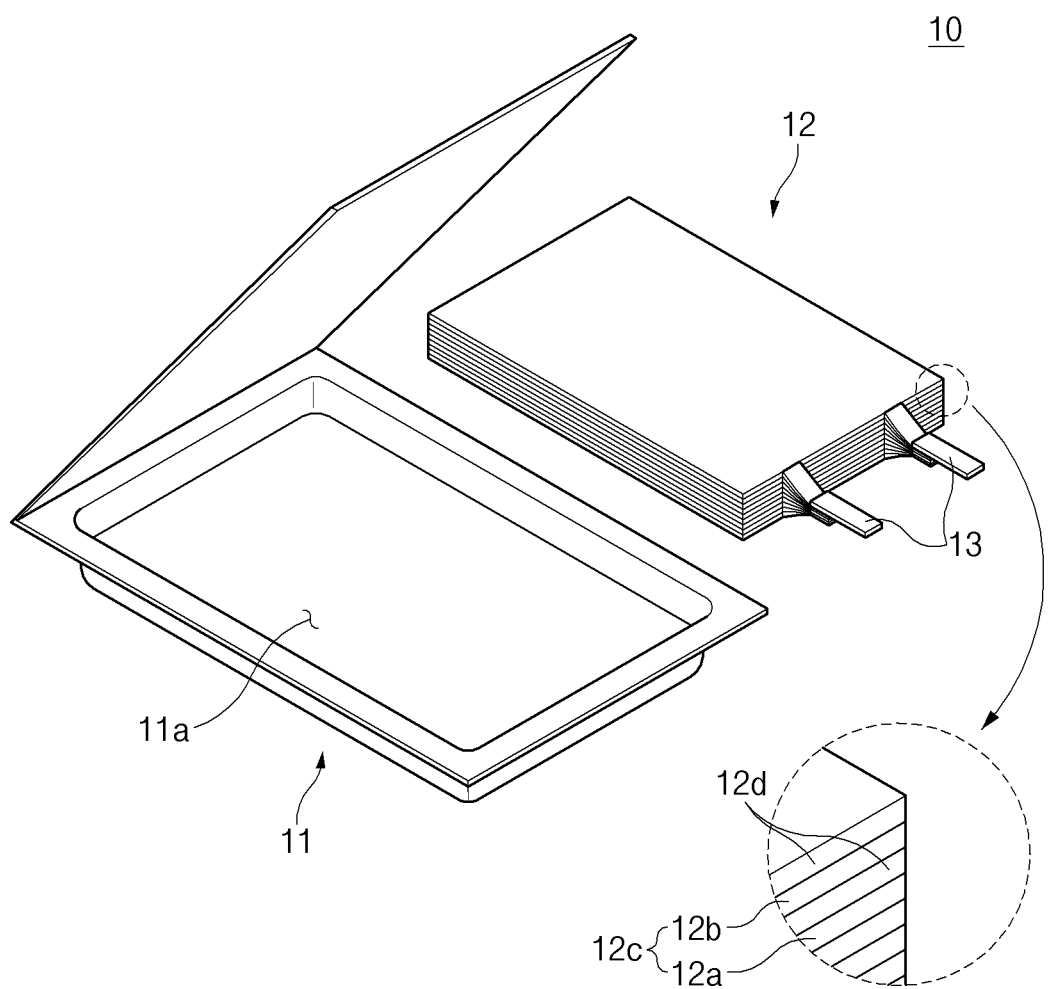
FIG. 2 is an exploded perspective view of the secondary battery according to the first embodiment of the present invention.

FIG. 1 is a conceptual perspective view of a secondary battery and an apparatus for measuring a dimension of the secondary battery according to a first embodiment of the present invention, and FIG. 2 is an exploded perspective view of the secondary battery according to the first embodiment of the present invention.

Referring to FIGS. 1 and 2, a secondary battery 10 according to the first embodiment of the present invention comprises an electrode assembly 12, a pouch 11 accommodating the electrode assembly 12 therein, and a fluorescent reference marker 14 applied to a portion of an outer surface of the pouch 11 and comprising a fluorescent material.

The electrode assembly 12 may be a chargeable and dischargeable power generation element and have a structure in which an electrode 12c and a separator 12d are combined and alternately stacked.

The electrode 12c may comprise a positive electrode 12a and a negative electrode 12b. Here, the electrode assembly 12 may have a structure in which the positive electrode 12a/the separator 12d/the negative electrode 12b are alternately stacked. Here, the separator 12d may be disposed between the positive electrode 12a and the negative electrode 12b and also disposed outside the positive electrode 12a and outside the negative electrode 12b.

The separator 12d is made of an insulation material to electrically insulate the positive electrode 12a from the negative electrode 12b. Here, the separator 12d may be made of, for example, a polyolefin-based resin film such as polyethylene or polypropylene having micropores.

One side of an electrode tab 13 may be connected to the electrode 12c so that the electrode tab 13 is electrically connected to the electrode 12c.

Figure 3:
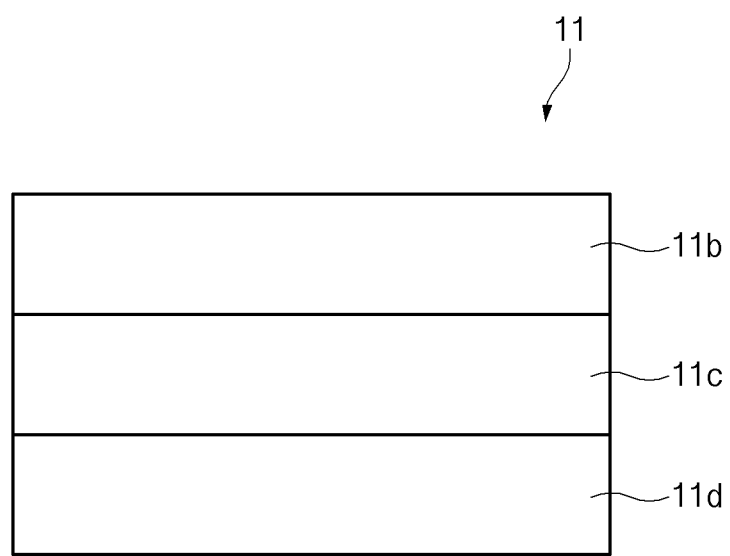
FIG. 3 is a cross-sectional view illustrating a main part of a pouch of the secondary battery according to the first embodiment of the present invention.

FIG. 3 is a cross-sectional view illustrating a main part of the pouch of the secondary battery according to the first embodiment of the present invention.

Referring to FIGS. 2 and 3, the pouch 11 accommodates the electrode assembly 12 and the electrode tab 13 therein.

Also, the pouch 11 may comprise a main body 11a accommodating the electrode assembly 12 and the electrode tab 13. Here, the main body 11a may have an accommodation part T that is a space accommodating the electrode assembly 12 therein.

The pouch 11 comprises a plurality of layers, i.e., a nylon layer lib, an aluminum (Al) layer 11c, and a resin layer 11d, which are sequentially disposed inward from the outside. That is, in the pouch 11, the aluminum (Al) layer 11c may be provided as a central layer, the nylon layer lib may be provided as the outermost layer. Also, the resin layer 11d made of a synthetic resin may be provided as an inner layer adjacent to the accommodation part T. Here, the resin layer 11d may be made of, for example, polypropylene (PP).

Referring to FIG. 1, the fluorescent reference marker 14 may be applied to a portion of the outer surface of the pouch 11 and comprise the fluorescent material. Here, the fluorescent material may comprise a transparent fluorescent material which is visible when ultraviolet rays are irradiated. Thus, the fluorescent reference maker 14 may emit fluorescence (light) when electromagnetic waves are irradiated so as to become a reference point for measuring a dimension of the secondary battery 10.

In more detail, for example, the fluorescent material may be a transparent fluorescent material which is invisible in a visible range and absorbs ultraviolet light (300 nm to 380 nm) to exhibit a fluorescence peak in the range of 400 nm to 650 nm. Here, the transparent fluorescent material may comprise one of an inorganic fluorescent pigment, an organic fluorescent pigment, and an organic fluorescent dye. Here, the inorganic fluorescent pigment may comprise one of tungstate, arsenate, silicate, and phosphate of an alkaline earth metal such as calcium tungstate, calcium magnesium arsenate, barium silicate, calcium phosphate, and calcium phosphate. Also, the organic fluorescent pigment may comprise, for example, one of 2,5, thiophendi(5-tert-butyl-1,3 benzooxazole), 4,4'-bis(benzooxazol-2-Luis) stilbene; organic fluorescent dyes, for example, coumarin derivatives such as 4,4'-bis(4-phenyl-1,2,3-triazol-2-yl) stilbene-2', sodium 2'-disulfonate, 3-phenyl-7-(4-methyl-5-phenyl-1,2,3-triazol-2-yl) coumarin, 3-phenyl-7-(2H-naphtho[1,2-d]-triazol-2-yl) coumarin, 1-(4-Acidosulfonylphenyl)-3-(4-chlorophenyl)-2-pyrazoline, and the like, naphthaimide derivatives, stilbene derivatives, benzothiazole derivatives, benzoimidazole derivatives, benzoxazole derivatives, benzidine derivatives, and oxazinone derivatives. Also, the organic fluorescent dye may comprise, for example, 4,4'-bis (4-phenyl-1,2,3-triazol-2-yl) stilbene-2', sodium 2'-disulfonate, 3-phenyl-7-(4-methyl-5-phenyl-1,2,3-triazol-2-yl) coumarin, 3-phenyl-7-(2H-naphtho[1,2-d]-triazol-2-yl) coumarin, 1-(4-Acidosulfonylphenyl)-3-(4-chlorophenyl)-2-pyrazoline, and the like, naphthaimide derivatives, stilbene derivatives, benzothiazole derivatives, benzoimidazole derivatives, benzoxazole derivatives, benzidine derivatives, and oxazinone derivatives.

For another example, the fluorescent material may comprise transparent and colorless fluorescent dyes which absorb ultraviolet light (330 nm to 380 nm) and emit blue-violet light (400 nm to 450 nm) of a visible portion by fluorescence. Here, the fluorescent material may comprise, for example, a coumarin-based or diazoyl-based fluorescent brightening agent which is dyed for a polyamide-based fiber such as nylon by an acid dye-based dyeing principle. Thus, when the nylon layer 11b is formed at the outermost layer of the pouch 11, the fluorescent material may be easily dyed (see FIG. 3).

The fluorescent reference marker 14 may further comprise an ultraviolet absorbing material. Thus, the ultraviolet absorbing material may induce the fluorescent material to more emit the fluorescence. Thus, the fluorescent reference marker 14 may be more easily recognized.

Also, the ultraviolet absorbing material may comprise, for example, one of benzophenone-based ultraviolet absorbing materials such as 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-decyloxybenzophenone, 2,2',4,4'-tetrahydroxybenzophenone, and the like, benzotriazole-based ultraviolet absorbing materials such as 2-(2-hydroxy-5-methylphenyl) benzotriazole, 2-(2-hydroxy-3,5-di-t-butylphenyl) benzotriazole, 2-(2-hydroxy-3-t-butyl-5-methylphenyl)-5-chlorobenzotriazole, 2-(2-hydroxy-3,5-di-t-pentylphenyl) benzotriazole, 2-(2-hydroxy-3-t-butyl-5-methylphenyl) benzotriazole 2-(2-hydroxy-5-t-octylphenyl) benzotriazole, 2-(2-hydroxy-3,5-di-t-amylphenyl) benzotriazole, and the like, benzoate-based ultraviolet absorbing materials, di-t-butylphenyl-3,5-di-t-butyl-4-hydroxybenzoate and the like, salicylic acid-based ultraviolet absorbing materials, and cyanoacrylate-based ultraviolet absorbing materials.

Referring to FIG. 1, in the secondary battery 10 according to the first embodiment of the present invention, the fluorescent reference marker 14 may be disposed, for example, at a central portion of the outer surface of the secondary battery 10. Here, the fluorescent reference marker 14 may be disposed on a central portion of a top or bottom surface of the pouch 11 of the secondary battery 10.

Figure 4:
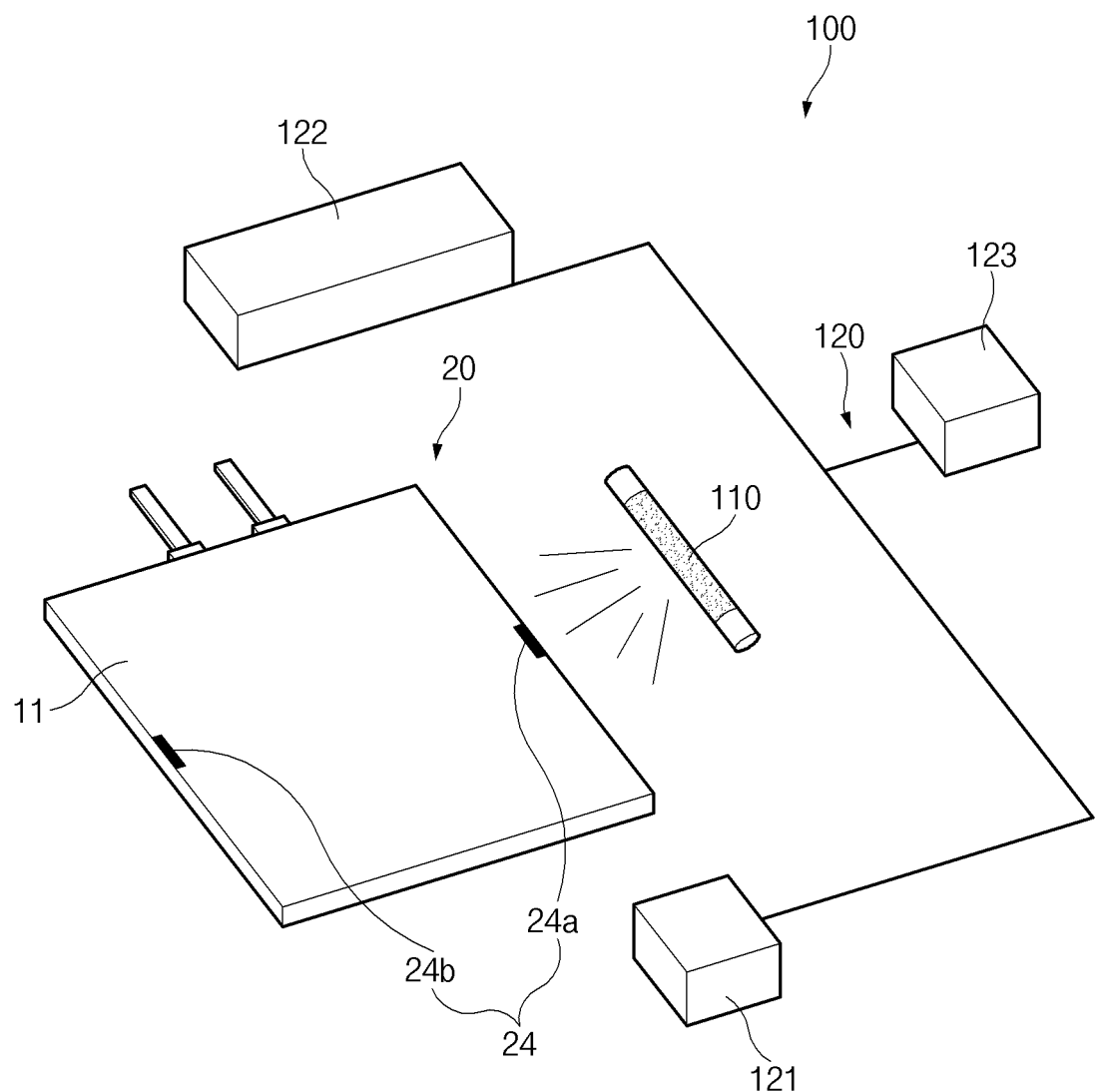
FIG. 4 is a perspective view illustrating a concept of applying a secondary battery according to a second embodiment of the present invention.

FIG. 4 is a perspective view illustrating a concept of applying a secondary battery according to a second embodiment of the present invention.

Alternatively, referring to FIG. 4, in a secondary battery 20 according to a second embodiment of the present invention, a fluorescent reference marker 24 may be disposed, for example, on each of both sides of the outer surface of the secondary battery 20. Here, the fluorescent reference marker 24 may comprise one-side fluorescent reference marker 24a disposed at one side of the top or bottom surface of the pouch 1 and the other-side fluorescent reference maker 24b disposed at the other side of the top or bottom surface.

Thus, when the fluorescence is emitted through the ultraviolet rays, a dimension of the secondary battery 20 may be measured based on the fluorescent reference markers 24 disposed at both the sides of the pouch 11. Here, for example, a distance between the fluorescent reference markers 24 disposed on both the sides of the pouch 11 may be measured to detect a width of the secondary battery 20.

Figure 5:
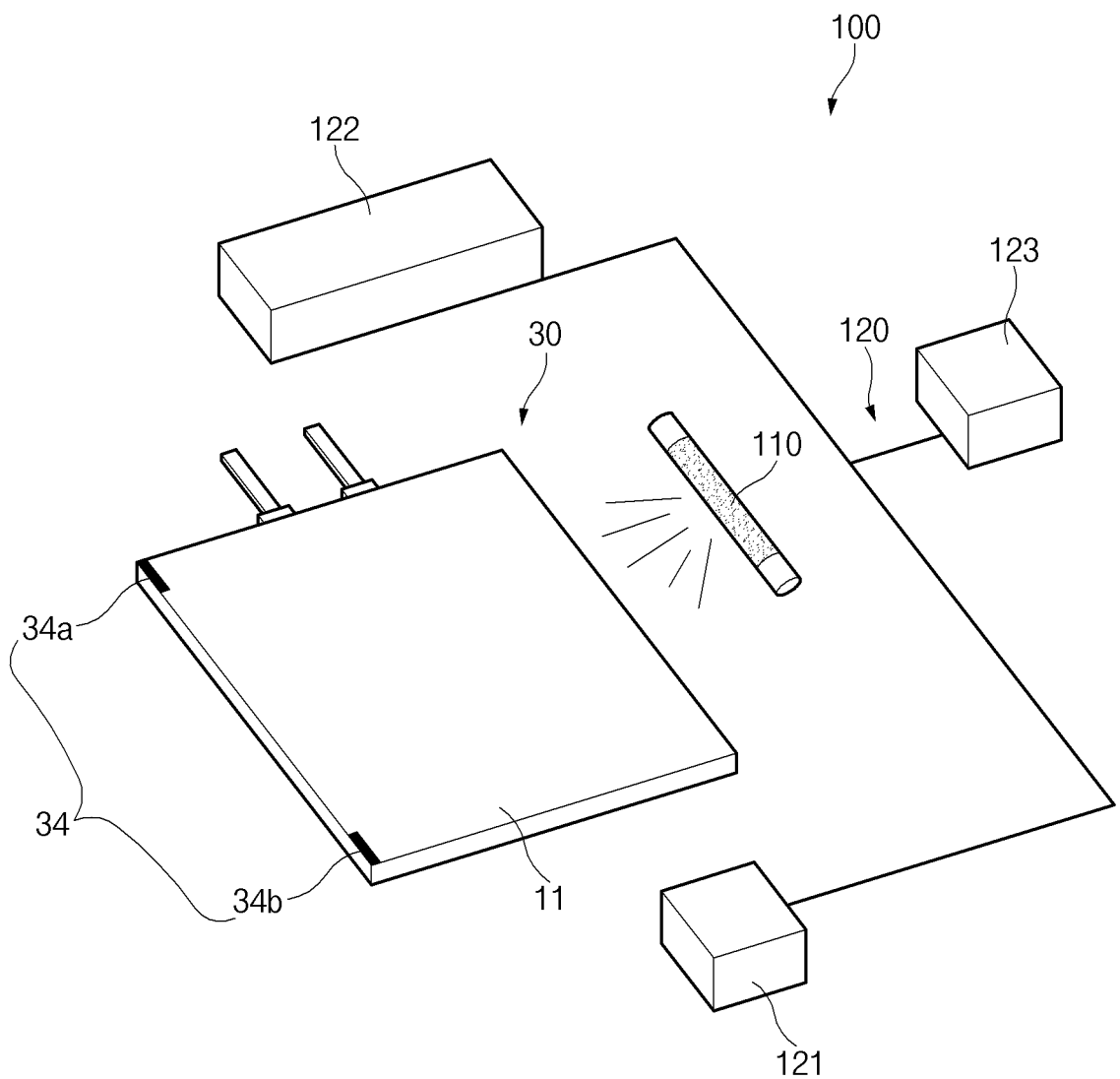
FIG. 5 is a perspective view illustrating a concept of applying a secondary battery according to a third embodiment of the present invention.

FIG. 5 is a perspective view illustrating a concept of applying a secondary battery according to a third embodiment of the present invention.

Also, referring to FIG. 5, in a secondary battery 30 according to a third embodiment of the present invention, a fluorescent reference marker 34 may be disposed, for example, on each of corners of the secondary battery 30. Here, the fluorescent reference marker 34 may be disposed at each of corners of a top or bottom surface of a pouch 11. Here, the fluorescent reference marker 34 may comprise a first fluorescent reference marker 34a disposed at a first-side corner of four corners of the pouch 11 and a second fluorescent reference marker 34b disposed at a second-side corner of the four corners of the pouch 11.

Thus, when the fluorescence is emitted through the ultraviolet rays, a dimension of the secondary battery 30 may be measured based on the fluorescent reference markers 34 disposed at each of the corners of the pouch 11. Here, for example, the fluorescent reference marker 34 disposed at one of the four corners of the pouch 1 may be used as a reference starting point (0,0) of X, Y coordinates when a dimension is measured.

Figure 6:
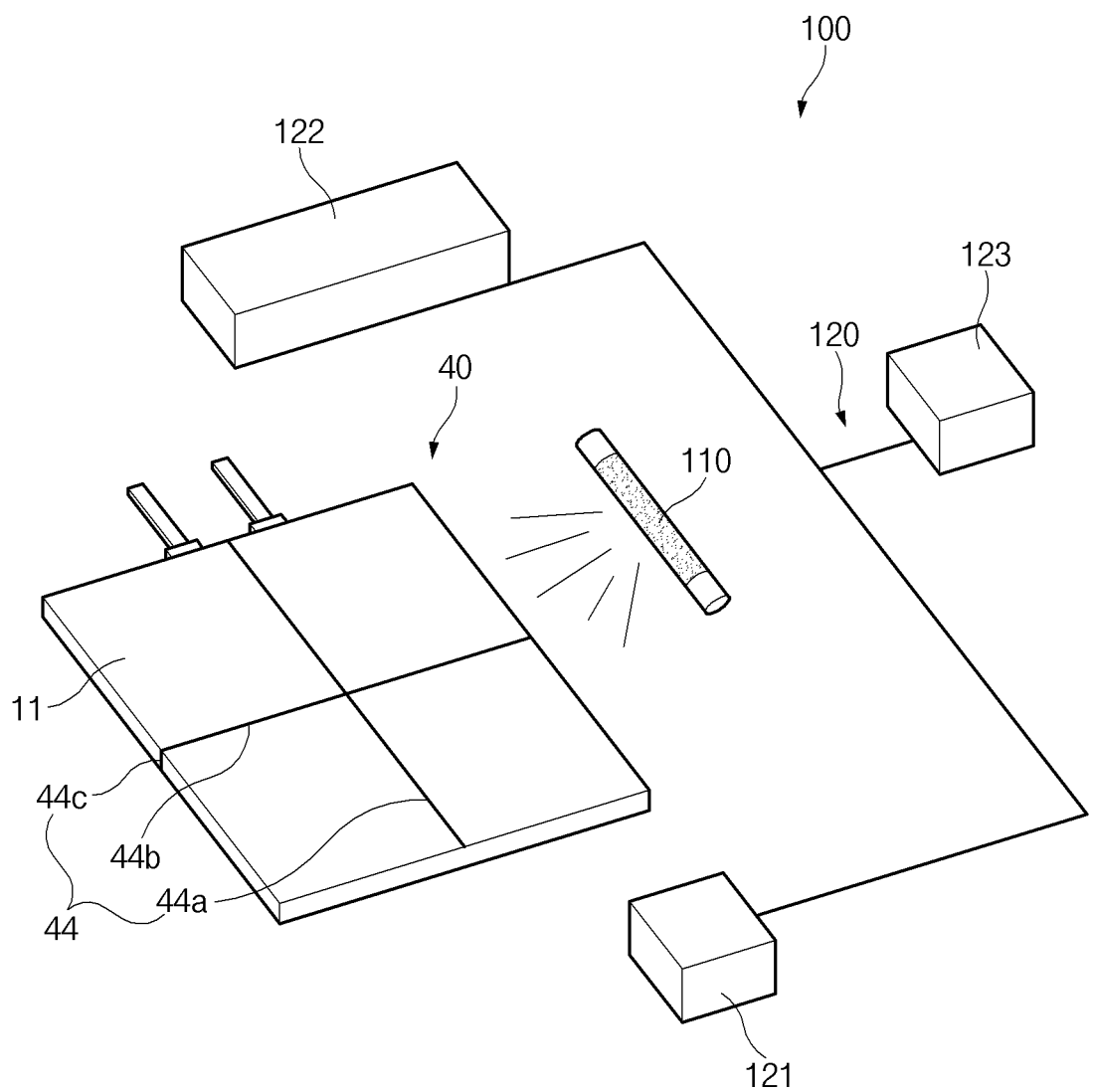
FIG. 6 is a perspective view illustrating a concept of applying a secondary battery according to a fourth embodiment of the present invention.

FIG. 6 is a perspective view illustrating a concept of applying a secondary battery according to a fourth embodiment of the present invention.

Also, referring to FIG. 6, in a secondary battery 40 according to a fourth embodiment of the present invention, a fluorescent reference marker 44 may be provided as a line along a longitudinal direction, a width direction, or a thickness direction of the secondary battery 40.

Thus, when fluorescence is emitted through ultraviolet rays, a dimension of the secondary battery 40 may be measured based on the fluorescent reference markers 44 provided as the line along the longitudinal direction, the width direction, or the thickness direction of a pouch 11.

Here, for example, in the fluorescent reference marker 44, when a length of a line of a length fluorescent reference marker 44a, which is formed in the longitudinal direction of the pouch 11, is measured, a length of the pouch 11 may be measured. When a length of a line of a width fluorescent reference marker 44b, which is formed in the width direction of the pouch 11, is measured, a width of the pouch 11 may be measured. When a length of a line of a thickness fluorescent reference marker 44c, which is formed in the thickness direction of the pouch 11, is measured, a thickness of the pouch 11 may be measured.

Figure 7:
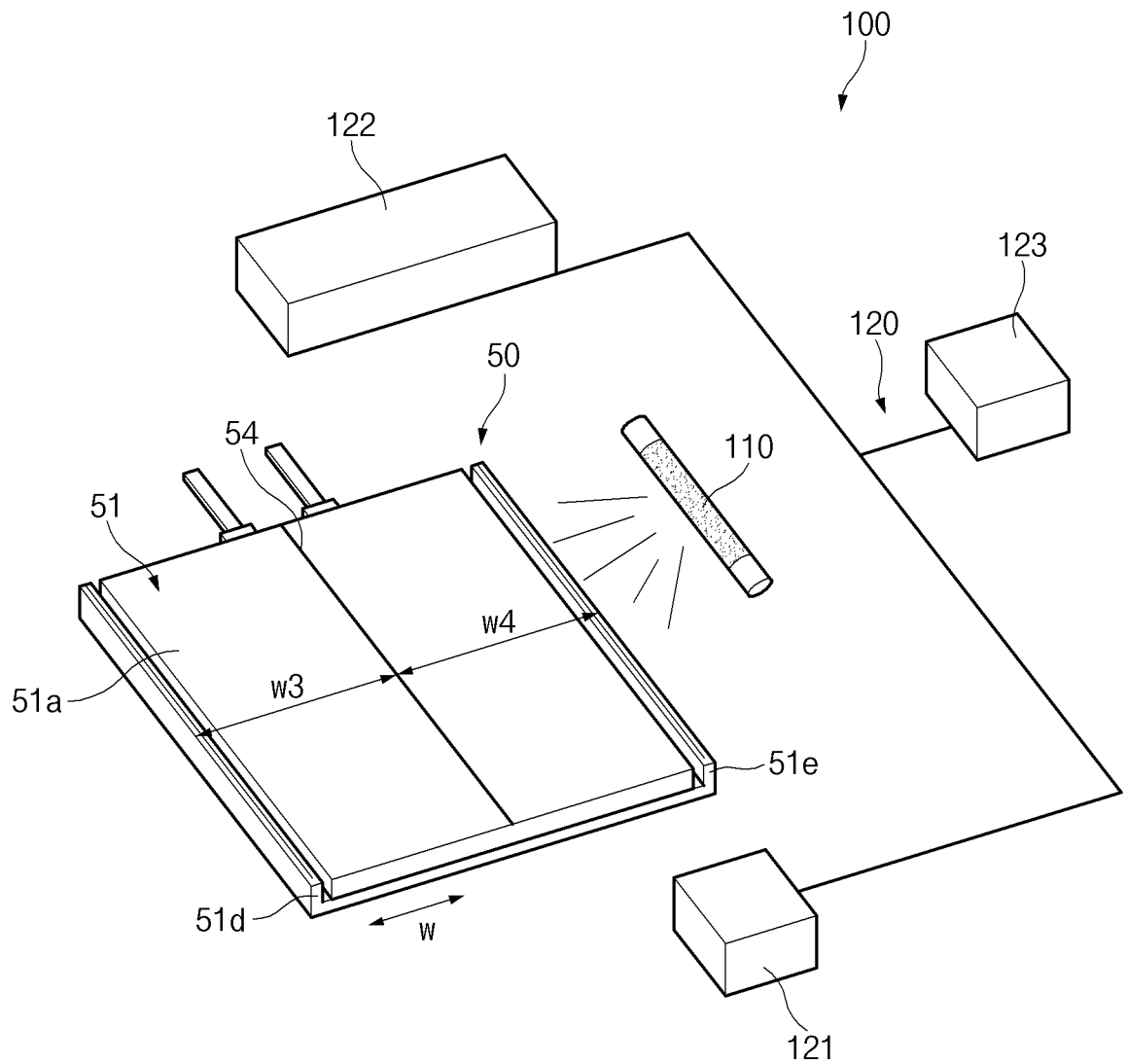
FIG. 7 is a perspective view illustrating a concept of applying a secondary battery according to a fifth embodiment of the present invention.

FIG. 7 is a perspective view illustrating a concept of applying a secondary battery according to a fifth embodiment of the present invention.

Also, referring to FIG. 7, in a secondary battery 50 according to a fifth embodiment of the present invention, a fluorescent reference marker 54 may be formed on a main body 51a of a pouch 51 in a line shape connecting centers to each other in a full width direction W of the secondary battery 50. Here, for example, the secondary battery 50 may have a shape in which wing parts 51d and 51e disposed on both sides of the main body 51a are folded in the pouch 51.

Thus, when fluorescence is emitted through ultraviolet rays, distances W3 and W4 up to both sides in a full width direction W of the main body 51a of the pouch 51 may be measured based on the fluorescent reference marker 54 of the pouch 51. That is, the full width may be extracted by measuring the dimension of both the sides of the main body 51a of the pouch 51 on the basis of the fluorescent reference marker 54. Thus, a full width for each manufacturing process of the secondary battery 50 and a variation in full width may be measured based on the fluorescent reference marker 54 of the pouch 51, and also, a tolerance may be easily analyzed.

Figure 8:
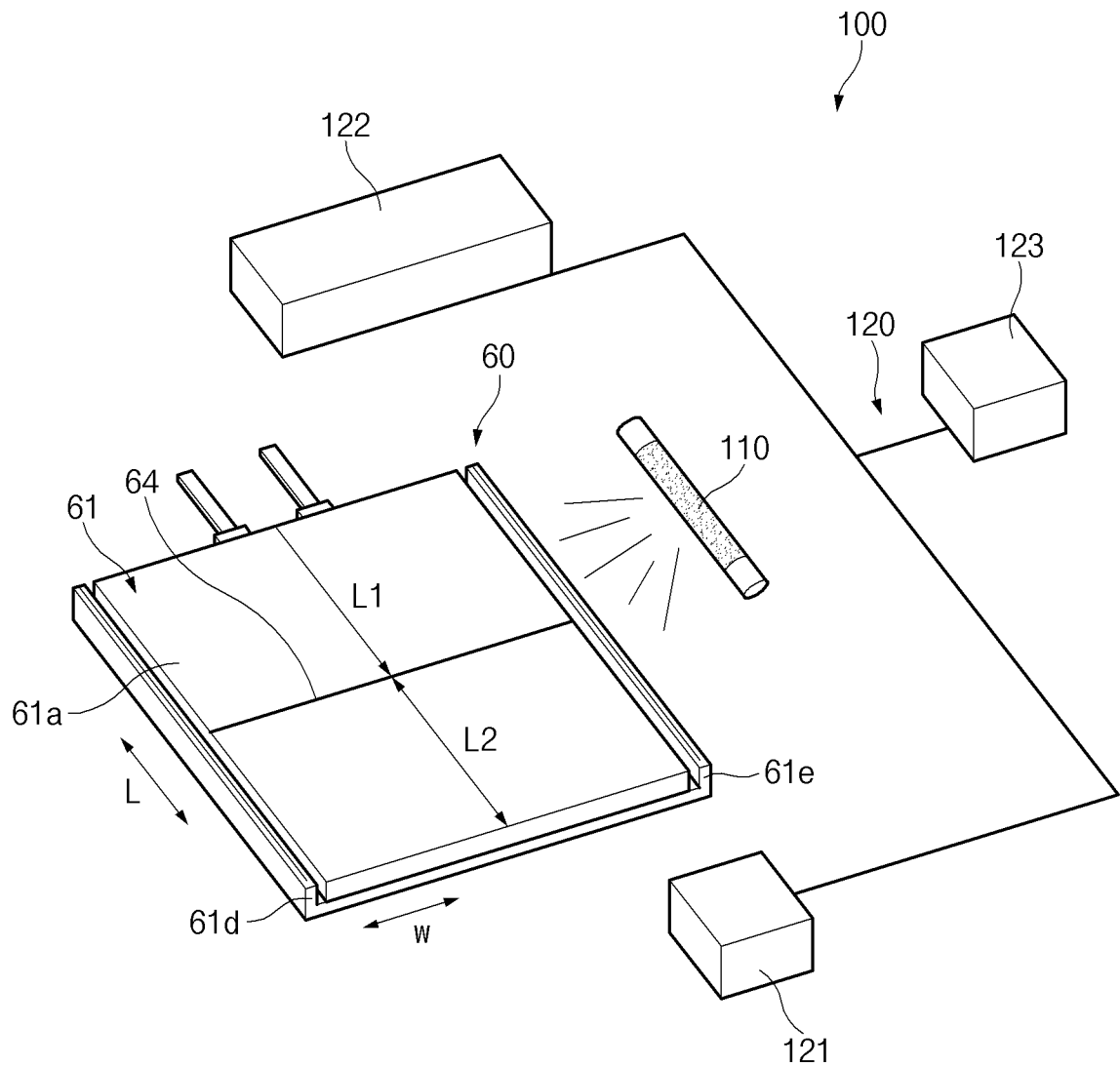
FIG. 8 is a perspective view illustrating a concept of applying a secondary battery according to a sixth embodiment of the present invention.

FIG. 8 is a perspective view illustrating a concept of applying a secondary battery according to a sixth embodiment of the present invention.

Also, referring to FIG. 8, in a secondary battery 60 according to a sixth embodiment of the present invention, a fluorescent reference marker 64 may be formed on a main body 61a of a pouch 61 in a line shape connecting centers to each other in a full length direction L of the secondary battery 60. Here, for example, the secondary battery 60 may have a shape in which wing parts 61d and 61e disposed on both sides of the main body 61a are folded in the pouch 61.

Thus, when fluorescence is emitted through ultraviolet rays, distances L1 and L2 up to both sides in the full length direction L of the main body 61a of the pouch 61 may be measured based on the fluorescent reference marker 64 of the pouch 61. Thus, a full length for each manufacturing process of the secondary battery 60 and a variation in full length may be measured based on the fluorescent reference marker 64 of the pouch 61, and also, a tolerance may be easily analyzed.

Hereinafter, an apparatus for measuring a dimension of a secondary battery according to an embodiment of the present invention will be described.

Referring to FIG. 1, an apparatus 100 for measuring a dimension of the secondary battery according to an embodiment of the present invention is an apparatus for measuring a dimension of the secondary battery. The apparatus 100 for measuring the dimension of the secondary battery comprises an ultraviolet irradiation unit 110 irradiating ultraviolet rays to fluoresce the fluorescent reference marker 14 and a laser measurement unit 120 irradiating/receiving laser light to/from the secondary battery 10.

The apparatus 100 for measuring the dimension of the secondary battery according to an embodiment of the present invention may be the apparatus for measuring the dimension of each of the secondary batteries 10, 20, 30, 40, 50, and 60 according to the foregoing first to sixth embodiments. Thus, in this embodiment, contents overlapping those according to the above-described embodiments will be briefly described, and the description will be focused on differences (see FIGS. 1 and 4 to 8).

In more detail, referring to FIG. 1, the ultraviolet irradiation unit 110 may irradiate ultraviolet rays to the secondary battery 10 to fluoresce a fluorescent reference marker 14 applied to a portion of an outer surface of the pouch 11 and comprising a fluorescent material.

Referring to FIGS. 1, 4, and 5, the ultraviolet irradiation unit 110 may irradiate the ultraviolet rays to the fluorescent reference marker 14 disposed on at least one of outer corners, side portions, or a central portion of the secondary battery 10. Also, referring to FIG. 6, the ultraviolet irradiation unit 110 may irradiate the ultraviolet rays to the fluorescent reference marker 14 provided as a line formed along a longitudinal direction, a width direction, or a thickness direction of the secondary battery 10. Furthermore, referring to FIGS. 7 and 8, the ultraviolet irradiation unit 110 may irradiate the ultraviolet rays to each of the fluorescent reference markers 54 and 64 formed on the pouch in a line shape connecting centers to each other in a full length direction or a full width direction of each of the secondary batteries 50 and 60. Furthermore, the ultraviolet irradiation unit 110 may irradiate the ultraviolet rays to the fluorescent reference maker 14 made of a transparent fluorescent material that is visible when the ultraviolet rays are irradiated.

The laser measurement unit 120 may irradiate/receive laser light to/from the secondary battery 10 to measure the dimension of the secondary battery 10 on the basis of the fluorescent reference marker that fluoresces to be detected.

Also, the laser measurement unit 120 may comprise a laser irradiation part 121, a light receiving part 122, and a calculation part 123.

The laser irradiation part 121 may irradiate laser light to the secondary battery 10.

The light receiving part 122 may receive reflected light of the laser light irradiated to the secondary battery 10 to receive the fluorescence of the fluorescent reference marker 14 that fluoresces by the ultraviolet rays irradiated by the ultraviolet irradiation unit 110.

The calculation part 123 may analyze the reflected light of the laser light received through the light receiving part 122 and a fluorescence detection value of the fluorescent reference marker 14 to calculate a dimension of the secondary battery 10 on the basis of the fluorescent reference marker 14. Also, the calculation part 123 may calculate a full length or full width of the whole main body 11a of the pouch 11 for each manufacturing process of the secondary battery 10 on the basis of the fluorescent reference marker 14.

As a result, the secondary battery dimension apparatus 100 according to an embodiment of the present invention may measure the dimension of the secondary battery 10 on the basis of the fluorescent reference marker 14 to prevent a measurement error from occurring or minimize the measurement error when measured. Also, it may be possible to measure a variation in full width and full length for each manufacturing process, and it may be possible to easily analyze a tolerance for each process.

Referring to FIG. 1, in the apparatus for measuring the dimension of the secondary battery according to the first embodiment of the present invention, the fluorescent reference marker 14 may be disposed at the central portion of the outer surface of the secondary battery 10.

Also, referring to FIG. 4, in the apparatus for measuring the dimension of the secondary battery according to the second embodiment of the present invention, the fluorescent reference marker 24 may be disposed on each of both the sides of the outer surface of the secondary battery 20.

Also, referring to FIG. 5, in the apparatus for measuring the dimension of the secondary battery according to the third embodiment of the present invention, the fluorescent reference marker 34 may be disposed on each of the corners of the outer surface of the secondary battery 30.

Also, referring to FIG. 6, in the apparatus for measuring the dimension of the secondary battery according to the fourth embodiment of the present invention, the fluorescent reference marker 44 may be provided as the line along the longitudinal direction, the width direction, or the thickness direction of the secondary battery 40.

Also, referring to FIG. 7, in the apparatus for measuring the dimension of the secondary battery according to the fifth embodiment of the present invention, the fluorescent reference marker 54 may be formed on the pouch 51 in the line shape connecting the centers to each other in the full width direction W of the secondary battery 50.

Also, referring to FIG. 8, in the apparatus for measuring the dimension of the secondary battery according to the sixth embodiment of the present invention, the fluorescent reference marker 64 may be formed on the pouch 61 in the line shape connecting the centers to each other in the full length direction L of the secondary battery 60.

Hereinafter, a method for measuring a dimension of a secondary battery according to an embodiment of the present invention will be described.

Referring to FIGS. 1 and 2, a method for measuring a dimension of the secondary battery according to an embodiment of the present invention is a method for measuring a dimension of a secondary battery comprising an electrode 12 and a pouch 11 comprising a main body 11a accommodating the electrode assembly 12 and comprise a fluorescent marking step of applying a fluorescent reference marker 14 on an outer surface of the pouch 11 to mark fluorescence, an ultraviolet irradiation step of allowing the fluorescent reference marker 14 applied to a portion of the outer surface of the pouch 11 to fluoresce, and a dimension measurement step of measuring a dimension of the secondary battery 10 on the basis of the fluorescent reference marker 14.

The method for measuring the dimension of the secondary battery according to an embodiment of the present invention is a method for measuring a dimension of each of the secondary batteries 10, 20, 30, 40, 50, and 60 according to the foregoing first to sixth embodiments through the apparatus for measuring the dimension of each of the secondary batteries according to the foregoing first to sixth embodiments. Thus, in this embodiment, contents overlapping those according to the above-described embodiments will be briefly described, and the description will be focused on differences (see FIGS. 1 and 4 to 8).

In the method for measuring the dimension of the secondary battery according to an embodiment of the present invention, the fluorescent marking step of applying the fluorescent reference marker 14 comprising a fluorescent material to a portion of the outer surface of the pouch 11 to mark the fluorescence.

In the ultraviolet irradiation step, ultraviolet rays may be irradiated to the pouch 11 to fluoresce the fluorescent reference marker 14 applied to the portion of the outer surface of the pouch 11.

In the dimension measurement step, laser light may be irradiated to the pouch 11 so that the fluorescent reference marker 14 receives the laser light, to measure a dimension of the secondary battery 10 on the basis of the fluorescent reference marker 14 that fluoresces to be detected.

Also, the dimension measurement step may comprise a laser irradiation step of irradiating laser light, a light receiving step of receiving reflected light of the irradiated laser light to receive fluorescence of the fluorescent reference marker 14 that fluoresces by the irradiated ultraviolet light, and an calculation step of analyzing the reflected light of the received laser light and a fluorescence detection value of the fluorescent reference marker 14 to calculate the dimension of the secondary battery 10 on the fluorescent reference marker 14.

Figure 9:
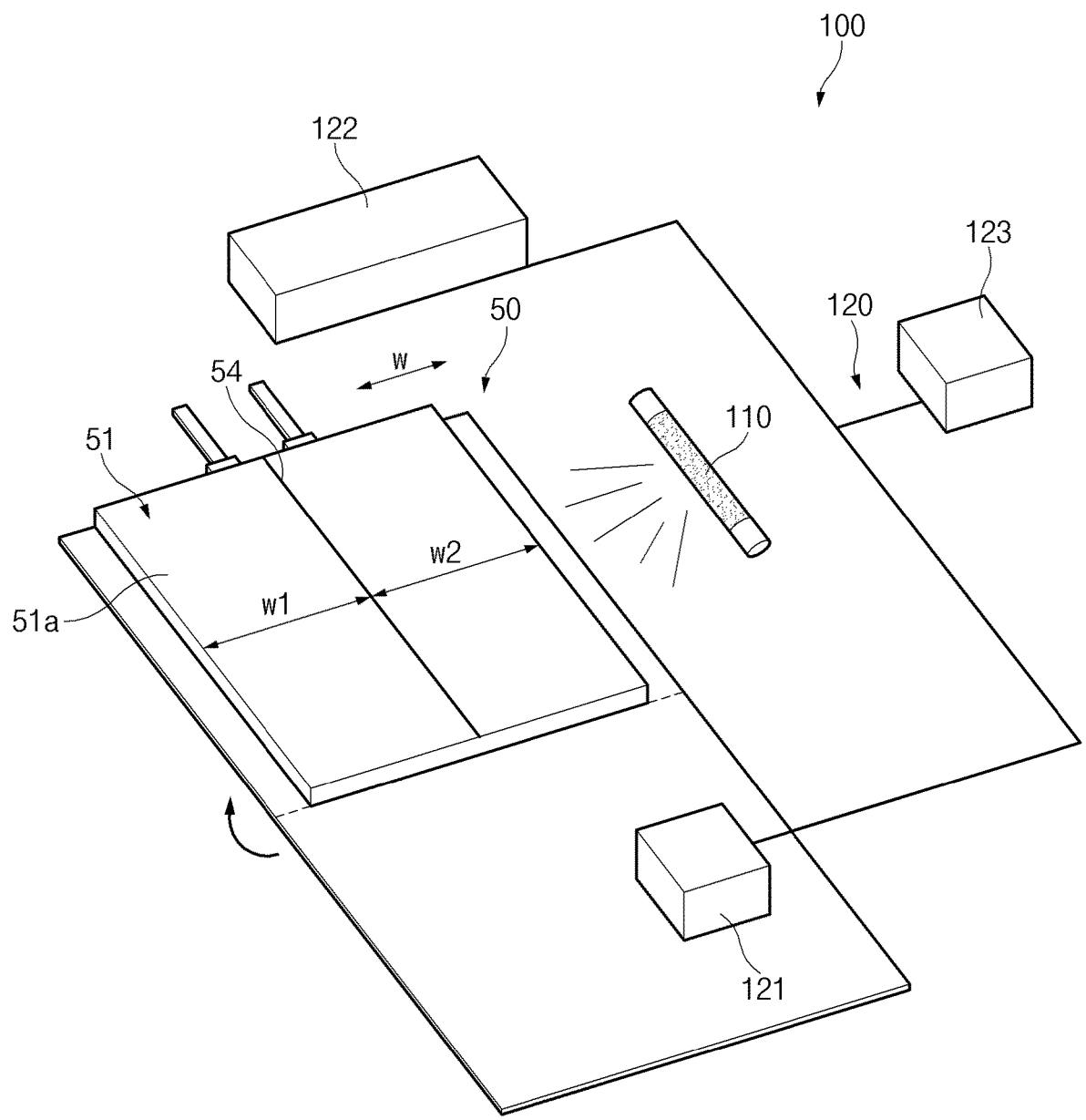
FIG. 9 is a perspective view illustrating an example of a first measurement step in a method for measuring a dimension of the secondary battery according to the fifth embodiment of the present invention.
Figure 10:
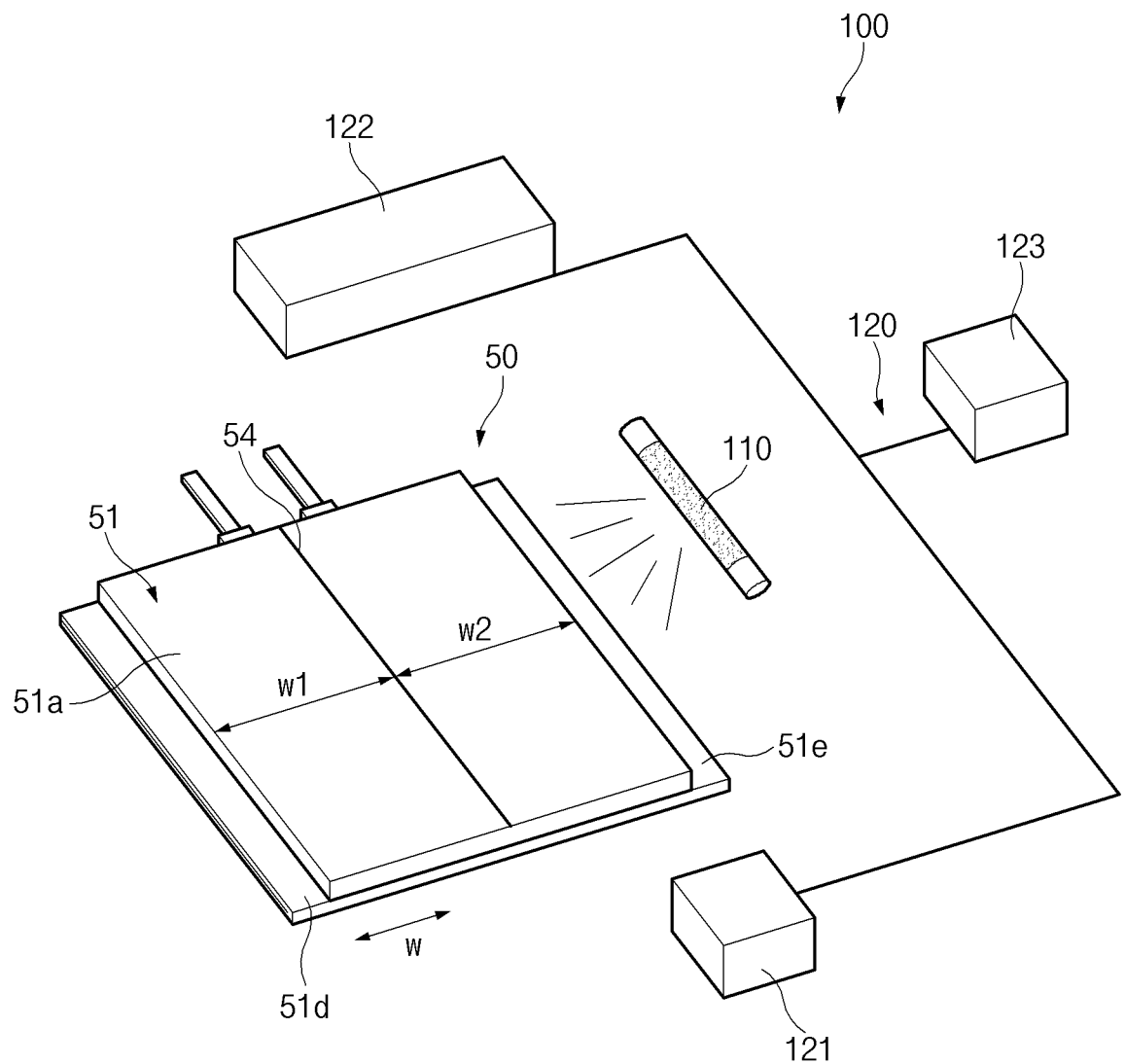
FIG. 10 is a perspective view illustrating an example of a second measurement step in the method for measuring the dimension of the secondary battery according to the fifth embodiment of the present invention.
Figure 11:
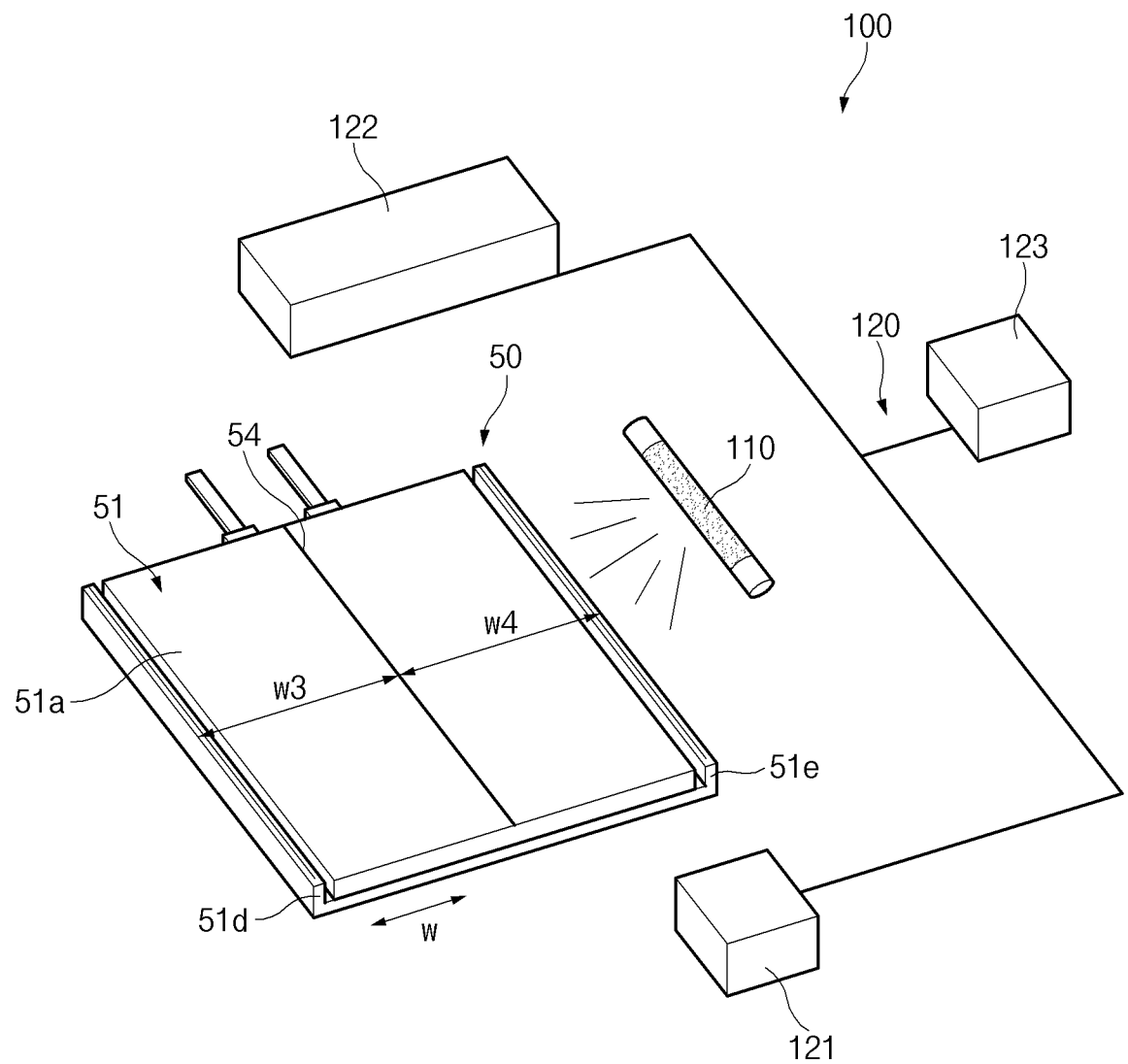
FIG. 11 is a perspective view illustrating an example of a third measurement step in the method for measuring the dimension of the secondary battery according to the fifth embodiment of the present invention.

FIG. 9 is a perspective view illustrating an example of a first measurement step in the method for measuring the dimension of the secondary battery according to the fifth embodiment of the present invention, FIG. 10 is a perspective view illustrating an example of a second measurement step in the method for measuring the dimension of the secondary battery according to the fifth embodiment of the present invention, and FIG. 11 is a perspective view illustrating an example of a third measurement step in the method for measuring the dimension of the secondary battery according to the fifth embodiment of the present invention.

Figure 12:
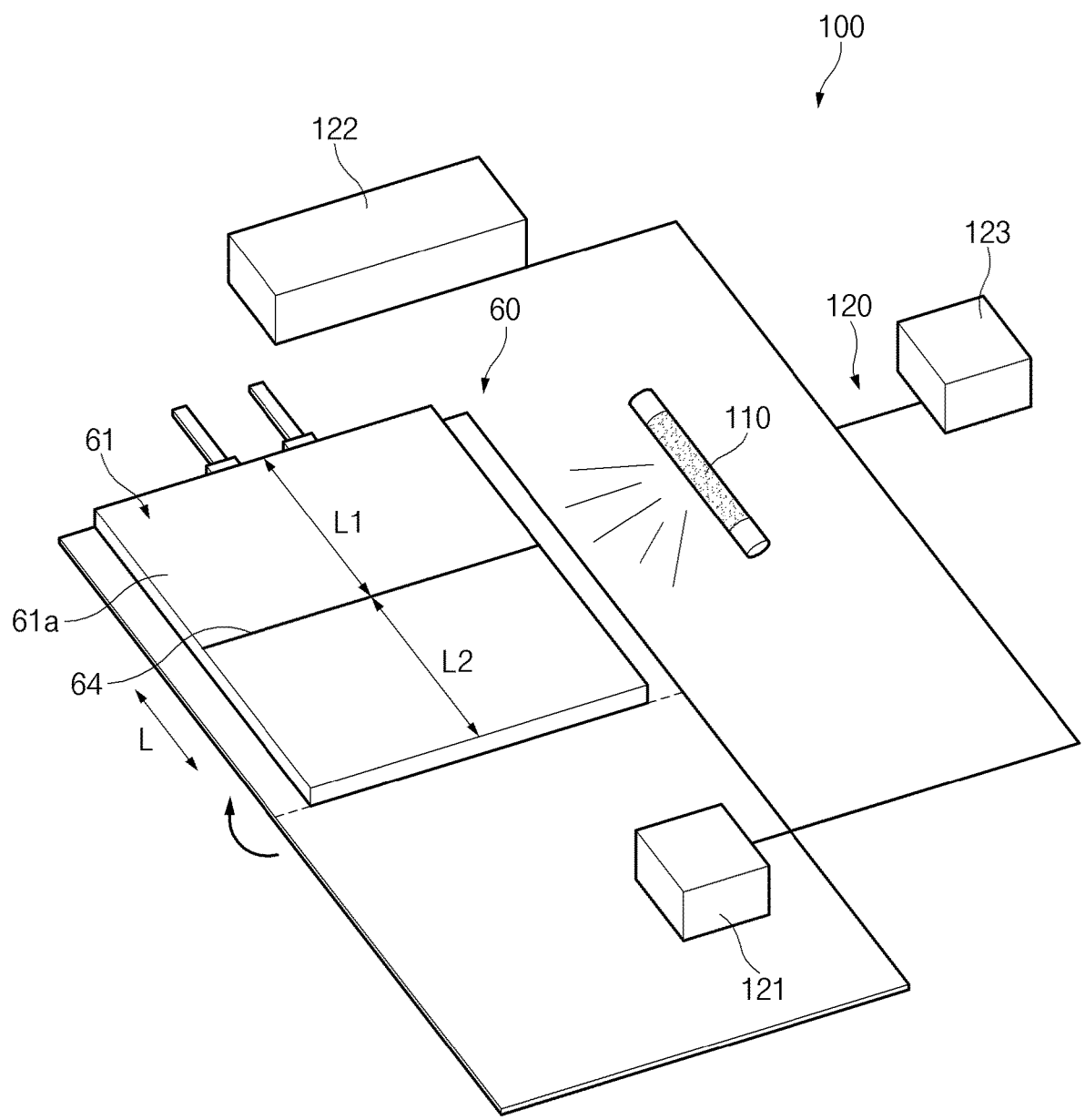
FIG. 12 is a perspective view illustrating an example of a first measurement step in a method for measuring a dimension of the secondary battery according to the sixth embodiment of the present invention.
Figure 13:
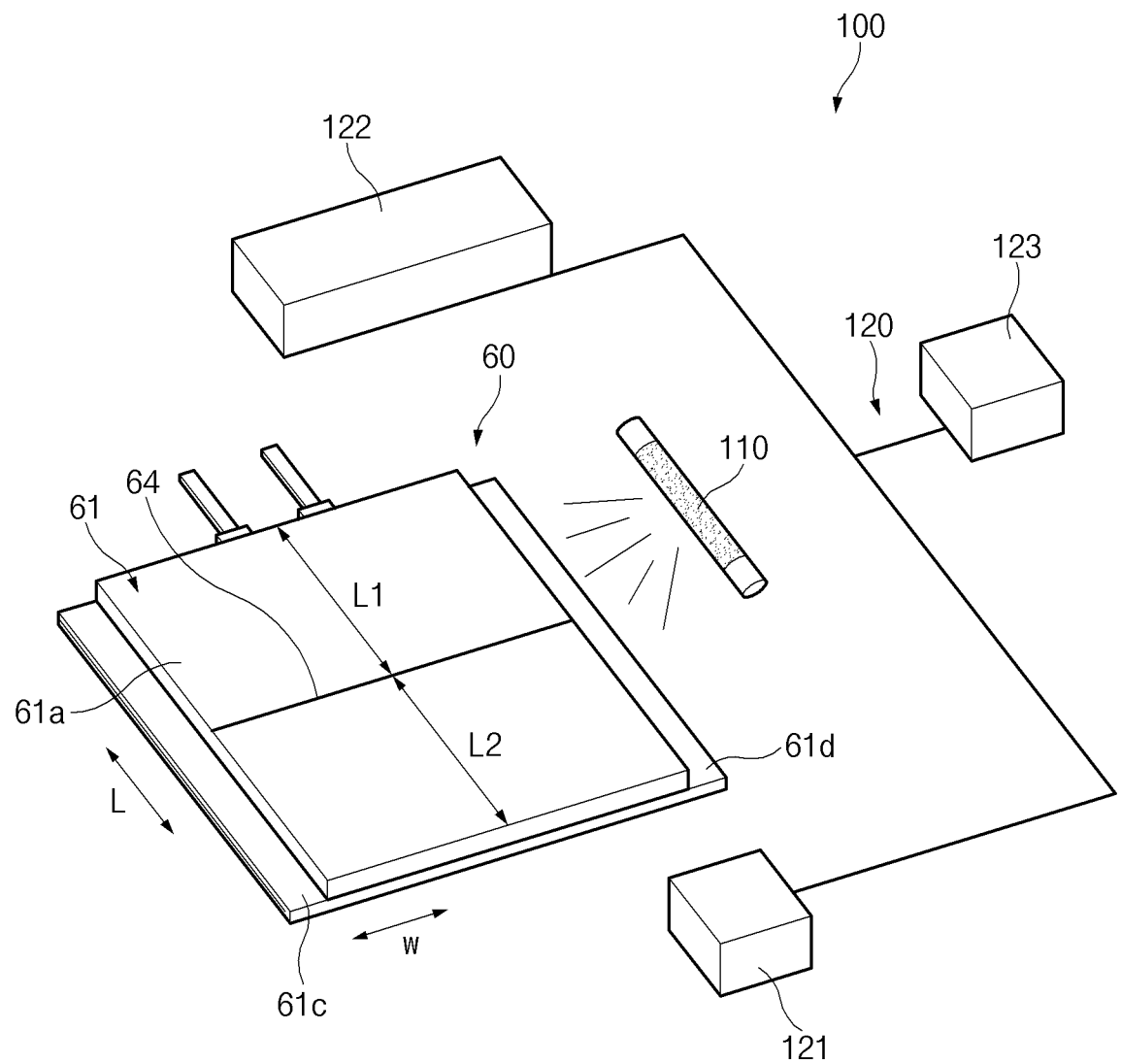
FIG. 13 is a perspective view illustrating an example of a second measurement step in the method for measuring the dimension of the secondary battery according to the fifth embodiment of the present invention.
Figure 14:
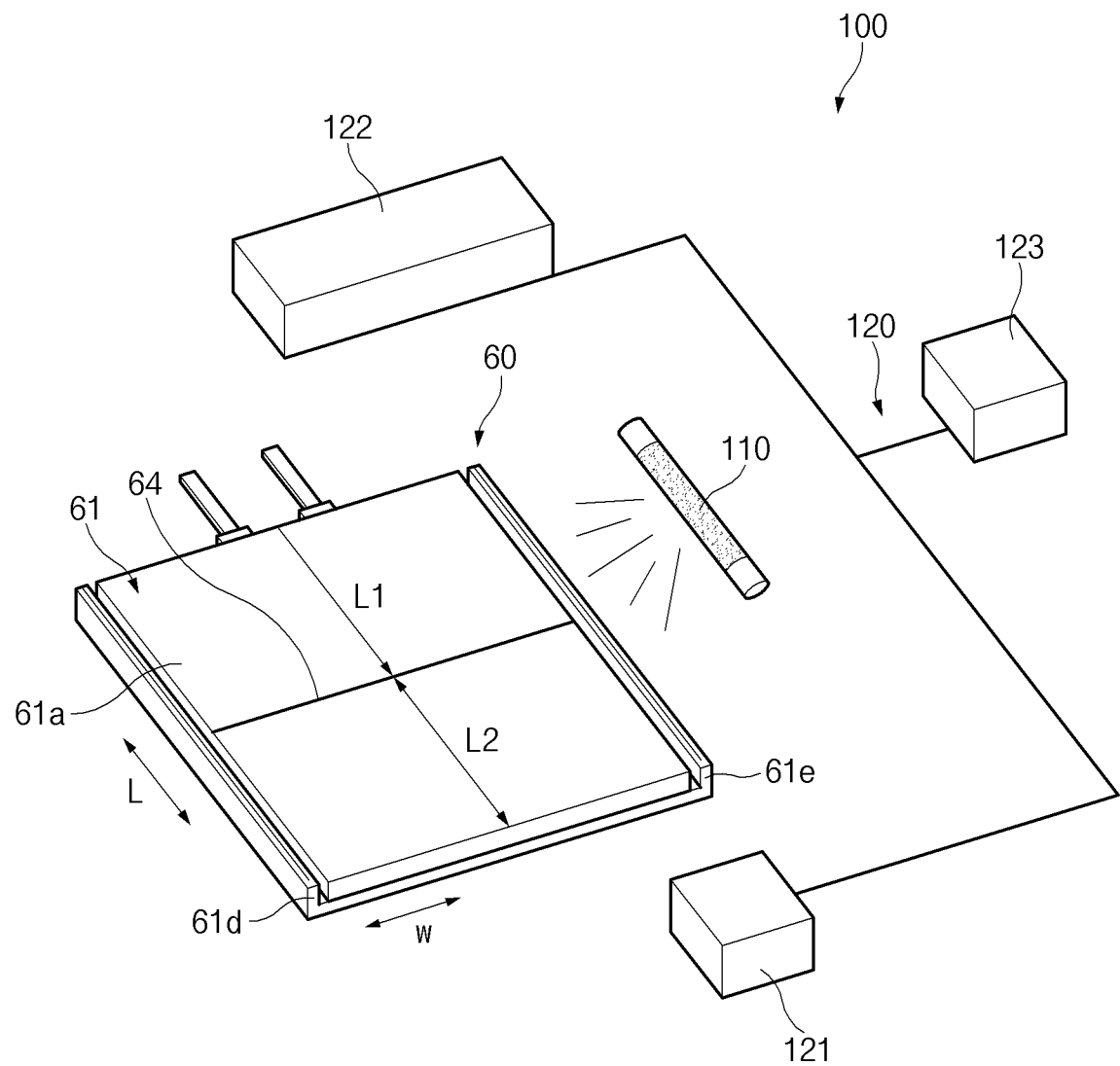
FIG. 14 is a perspective view illustrating an example of a third measurement step in a method for measuring a dimension of the secondary battery according to the sixth embodiment of the present invention.

FIG. 12 is a perspective view illustrating an example of a first measurement step in the method for measuring the dimension of the secondary battery according to the sixth embodiment of the present invention, FIG. 13 is a perspective view illustrating an example of a second measurement step in the method for measuring the dimension of the secondary battery according to the fifth embodiment of the present invention, and FIG. 14 is a perspective view illustrating an example of a third measurement step in a method for measuring a dimension of the secondary battery according to the sixth embodiment of the present invention.

Referring to FIGS. 1, 4, and 5, in the fluorescent marking step, the fluorescent reference marker 14 may be marked to fluoresce at one or more portions of the corners, the side portions, or the central portion of the secondary battery 10. Also, referring to FIG. 6, in the fluorescent marking step, the fluorescent reference marker 14 may be marked to fluoresce at at least one or more portions of the line formed along the longitudinal direction, the width direction, or the thickness direction of the secondary battery 10. Furthermore, referring to FIGS. 11 and 14, in the fluorescent marking step, the fluorescent reference marker 14 may be marked to fluoresce in the line shape connecting the centers to each other in the full length direction L or the full width direction W of each of the secondary batteries 50 and 60 on each of the main bodies 51a and 61a of the pouches 51 and 61.

That is, referring to FIG. 1, in the fluorescent marking step, the fluorescent reference marker 14 may be marked to fluoresce at the central portion of the outer surface of the secondary battery 10 through the method for measuring the dimension of the secondary battery according to the first embodiment of the present invention. Thus, in the dimension measurement step, the dimension may be calculated based on the fluorescent reference marker 14 to precisely measure a size of the secondary battery 10.

Also, referring to FIG. 4, in the fluorescent marking step, the fluorescent reference marker 24 may be marked to fluoresce at each of both the sides of the outer surface of the secondary battery 20 through the method for measuring the dimension of the secondary battery according to the second embodiment of the present invention. Thus, in the dimension measurement step, the dimension may be calculated based on the fluorescent reference marker 24 to precisely measure a size of the secondary battery 20.

Also, referring to FIG. 5, in the fluorescent marking step, the fluorescent reference marker 34 may be marked to fluoresce at each of the corners of the outer surface of the secondary battery 30 through the method for measuring the dimension of the secondary battery according to the third embodiment of the present invention. Thus, in the dimension measurement step, the dimension may be calculated based on the fluorescent reference marker 34 to precisely measure a size of the secondary battery 30.

Also, referring to FIG. 6, in the fluorescent marking step, the fluorescent reference marker 44 may be marked to fluoresce at at least one or more portions of the line formed along the longitudinal direction, the width direction, or the thickness direction of the secondary battery 40 through the method for measuring the dimension of the secondary battery according to the fourth embodiment of the present invention. Thus, in the dimension measurement step, the dimension may be calculated based on the fluorescent reference marker 44 to precisely measure a size of the secondary battery 40.

Also, referring to FIGS. 9 to 11, in the fluorescent marking step, the fluorescent reference marker 54 may be marked to fluoresce on the pouch 51 in the line shape connecting the centers to each other in the full width direction of the secondary battery 50 through the method for measuring the dimension of the secondary battery according to the fifth embodiment of the present invention. Here, in the dimension measurement step may comprise a first measurement step of measuring distances W1 and W2 up to both the sides of the main body 51*a* of the pouch 51 on the basis of the fluorescent reference marker 54 before the electrode assembly is accommodated in the pouch 51, a second measurement step of measuring distances W1 and W2 up to both the sides of the main body 51*a* of the pouch 51 on the basis of the fluorescent reference marker 54 after the electrode assembly is accommodated in the pouch 51, and a third measurement step of measuring distance W3 and W4 up to both the sides of the pouch 51 on the basis of the fluorescent reference marker 54 after the wing part is folded in the pouch 51 in which the electrode assembly is accommodated.

Here, in the first measurement step, the pouch 51 is provided in the form of a sheet. Thus, when the main body 51*a* is formed to provide a space in which the electrode assembly is accommodated, the full width of the pouch 51 with respect to the main body 51*a* may be measured. That is, the full width may be extracted by measuring the dimension of both the sides of the main body 51*a* of the pouch 51 on the basis of the fluorescent reference marker 54. Also, in the second measurement step, the full width of the pouch 51 with respect to the main body 51*a* when the pouch 51 having the sheet shape is folded with respect to a virtual line and partially degassed after being sealed. Furthermore, in the third measurement step, the wing parts 51*d* and 51*e* disposed on both sides of the main body 51*a* in the pouch 51 in which the electrode assembly is accommodated may be folded, and then, the full width of the pouch 51 comprising the wing parts 51*d* and 51*e* may be measured. Here, in the dimension measurement step, the measured full width value and the full width reference value for each process, which is stored in a memory (not shown) may be compared to each other through the calculation step to extract a tolerance for each process.

Thus, in the dimension measurement step, the full width of the pouch 51 for each manufacturing process of the secondary battery 50 may be measured based on the fluorescent reference marker. Thus, it may easy to measure the full width for each process and a variation in full width, and the tolerance for each process may be easily analyzed.

Also, referring to FIGS. 12 to 14, in the fluorescent marking step, the fluorescent reference marker 64 may be marked to fluoresce on the pouch 61 in the line shape connecting the centers to each other in the full length direction of the secondary battery 60 through the method for measuring the dimension of the secondary battery according to the sixth embodiment of the present invention. Here, the dimension measurement step may comprise a first measurement step of measuring distances L1 and L2 up to both the sides of the main body 61*a* of the pouch 61 on the basis of the fluorescent reference marker 64 before the electrode assembly is accommodated in the pouch 61 and a second measurement step of measuring distances L1 and L2 up to both the sides of the main body 61*a* of the pouch 61 on the basis of the fluorescent reference marker 64 after the electrode assembly is accommodated in the pouch 61. Here, referring to FIG. 14, the dimension measurement step may further comprise a third measurement step of measuring distances L1 and L2 up to both the sides of the pouch 61 on the basis of the fluorescent reference marker 64 after the wing parts 61*d* and 61*e* are folded in the pouch 61 in which the electrode assembly is accommodated.

Here, in the first measurement step, the pouch 61 is provided in the form of a sheet. Thus, when the main body 61*a* is formed to provide a space in which the electrode assembly is accommodated, the full length of the pouch 61 with respect to the main body 61*a* may be measured. Also, in the second measurement step, the full length of the pouch 61 with respect to the main body 61*a* when the pouch 61 having the sheet shape is folded with respect to a virtual line and degassed after the accommodation space is sealed. Furthermore, in the third measurement step, the wing parts 61*d* and 61*e* disposed on both sides of the main body 61*a* in the pouch 61 in which the electrode assembly is accommodated may be folded, and then, the full length of the pouch 61 may be measured. Here, in the dimension measurement step, the measured full length value and the full length reference value for each process, which is stored in a memory (not shown) may be compared to each other through the calculation step to extract a tolerance for each process.

Thus, in the dimension measurement step, the full length of the pouch 61 for each manufacturing process of the secondary battery 60 may be measured based on the fluorescent reference marker 64. Thus, it may easy to measure the full length for each process and a variation in full length, and the tolerance for each process may be easily analyzed.

While the present invention has been particularly shown and described with reference to exemplary embodiments thereof, this is for the purpose of specifically describing the present invention, and thus, the secondary battery and the apparatus and method for measuring the dimension of the secondary battery according to the present invention are not limited thereto. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
    an electrode assembly in which an electrode and a separator are alternately laminated to be combined with each other;
    a pouch accommodating the electrode assembly therein; and
    a fluorescent reference marker deposited on a portion of an outer surface of the pouch and comprising a fluorescent material,
    wherein the fluorescent reference marker emits fluorescence when an electromagnetic wave is irradiated so that the fluorescent reference marker serves as a reference point for measuring a dimension of the secondary battery, and
    the fluorescent reference marker is deposited at each side or at each corner of the outer surface of the battery.

2. The secondary battery of claim 1, wherein the electromagnetic wave comprises ultraviolet rays, and
    the fluorescent material comprises a transparent fluorescent material that is visible when the ultraviolet rays are irradiated.

3. The secondary battery of claim 1, wherein the pouch comprises a nylon layer, an aluminum layer, and a resin layer, which are laminated inward from the outside.

4. The secondary battery of claim 1, wherein the fluorescent reference marker further comprises an ultraviolet absorbing material.

5. The secondary battery of claim 1, wherein the fluorescent reference marker is deposited as a line formed along at least one of a longitudinal direction and a width direction of the secondary battery.

6. The secondary battery of claim 1, wherein the fluorescent reference marker comprises at least one of an inorganic fluorescent pigment, an organic fluorescent pigment, or an organic fluorescent dye.

7. The secondary battery of claim 6, wherein the inorganic fluorescent pigment comprises at least one of tungstate, arsenate, silicate, calcium tungstate, calcium magnesium arsenate, barium silicate, calcium phosphate, or calcium phosphate.

8. The secondary battery of claim 6, wherein the organic fluorescent pigment comprises at least one of 2,5-thiophendi (5-tert-butyl-1,3 benzooxazole), 4,4'-bis(benzooxazol-2-Luis) stilbene.

9. The secondary battery of claim 6, wherein the organic fluorescent dye comprises at least one of 3-phenyl-7-(4-methyl-5-phenyl-1,2,3-triazol-2-yl)coumarin, 3-phenyl-7-(2H-naphtho[1,2-d]-triazol-2-yl)coumarin, 1-(4-Acidosulfonylphenyl)-3-(4-chlorophenyl)-2-pyrazoline, 3-phenyl-7-(4-methyl-5-phenyl-1,2,3-triazol-2-yl) coumarin, 3-phenyl-7-(2H-naphtho[1,2-d]-triazol-2-yl) coumarin, or 1-(4-Acidosulfonylphenyl)-3-(4-chlorophenyl)-2-pyrazoline.

10. An apparatus for measuring a dimension of a secondary battery, comprising an electrode assembly and a pouch accommodating the electrode assembly, the apparatus comprising:
an ultraviolet light irradiating ultraviolet rays to fluoresce a fluorescent reference marker deposited on a portion of an outer surface of the pouch, wherein the fluorescent reference marker comprises a fluorescent material; and
a laser measurement unit measuring the dimension of the secondary battery on the basis of detected fluorescence of the fluorescent reference marker irradiating laser light to the pouch; and receiving reflected laser light irradiated to the pouch and fluorescence of the fluorescent reference marker that fluoresces by the ultraviolet rays irradiated by the ultraviolet light to measure the dimension of the secondary battery on the basis of detected fluorescence of the fluorescent reference marker.

11. The apparatus of claim 10, wherein the laser measurement unit comprises:
a laser irradiating the laser light to the pouch;
a light receiver receiving reflected light of the laser light irradiated to the pouch to receive the fluorescence of the fluorescent reference marker that fluoresces by the ultraviolet rays irradiated by the ultraviolet light; and
a calculator connected to the laser measurement unit and analyzing the reflected light of the laser light received through the light receiving part and a fluorescence detection value of the fluorescent reference marker to calculate the dimension of the secondary battery on the basis of the fluorescent reference marker.

12. The apparatus of claim 10, wherein the ultraviolet light irradiates the ultraviolet rays to the fluorescent reference marker that is disposed at least one of corners, side portions, or a central portion of an outer surface of the secondary battery.

13. The apparatus of claim 10, wherein the ultraviolet light irradiates the ultraviolet rays to the fluorescent reference marker deposited as a line formed along a longitudinal direction, a width direction, or a thickness direction of the secondary battery.

14. A method for measuring a dimension of a secondary battery comprising an electrode assembly and a pouch comprising a main body accommodating the electrode assembly, the method comprising:
a fluorescent marking step of applying a fluorescent reference marker comprising a fluorescent material on a portion of an outer surface of the pouch;
an ultraviolet irradiation step of irradiating ultraviolet rays to the pouch to allow the fluorescent reference marker applied to a portion of the outer surface of the pouch to fluoresce;
a dimension measurement step of irradiating laser light to the pouch; and
receiving reflected light from the pouch to measure the dimension of the secondary battery on the basis of detected fluorescence of the fluorescent reference marker.

15. The method of claim 14, wherein the dimension measurement step comprises:
a laser irradiation step of irradiating the laser light to the pouch;
a light receiving step of receiving reflected light of the irradiated laser light to receive fluorescence of the fluorescent reference marker that fluoresces by the irradiated ultraviolet light; and
a calculation step of analyzing the reflected light of the received laser light and a fluorescence detection value of the fluorescent reference marker to calculate the dimension of the secondary battery on the fluorescent reference marker.

16. The method of claim 15, wherein, in the fluorescent marking step, the fluorescent reference marker is marked to fluoresce at at least a portion of corners, side portions, or a central portion of the secondary battery.

17. The method of claim 15, wherein, in the fluorescent marking step, the fluorescent reference marker is marked to forms a line along a longitudinal direction, a width direction, or a thickness direction of the secondary battery.

18. The method of claim 15, wherein, in the fluorescent marking step, the fluorescent reference marker is marked to form a line shape connecting centers to each other in a full length direction or a full width direction of the secondary battery on a main body of the pouch.

19. The method of claim 18, wherein the dimension measurement step comprises:
a first measurement step of measuring distances up to both sides of the main body of the pouch on the basis of the detected fluorescence of the fluorescent reference marker before the electrode assembly is accommodated in the pouch; and
a second measurement step of measuring distances up to both the sides of the main body of the pouch on the basis of the detected fluorescence of the fluorescent reference marker after the electrode assembly is accommodated in the pouch.

20. The method of claim 19, wherein the dimension measurement step further comprises a third measurement step of measuring distances up to both the sides of the pouch on the basis of the detected fluorescence of the fluorescent reference marker after wing parts are folded in the pouch in which the electrode assembly is accommodated.

\* \* \* \* \*